US008889753B2

(12) United States Patent
Bernreitner et al.

(10) Patent No.: US 8,889,753 B2
(45) Date of Patent: Nov. 18, 2014

(54) BLOWNFILM GRADE SHOWING SUPERIOR STIFFNESS, TRANSPARENCY AND PROCESSING BEHAVIOUR

(75) Inventors: Klaus Bernreitner, Linz (AT); Peter Niedersuss, Linz (AT); Markus Gahleitner, Neunhofen/Krems (AT)

(73) Assignee: Borealis AG, Vienna (AT)

(*) Notice: Subject to any disclaimer, the term of this patent is extended or adjusted under 35 U.S.C. 154(b) by 0 days.

(21) Appl. No.: 13/515,912

(22) PCT Filed: Dec. 15, 2010

(86) PCT No.: PCT/EP2010/069788
§ 371 (c)(1),
(2), (4) Date: Jun. 14, 2012

(87) PCT Pub. No.: WO2011/076636
PCT Pub. Date: Jun. 30, 2011

(65) Prior Publication Data
US 2012/0295994 A1 Nov. 22, 2012

(30) Foreign Application Priority Data
Dec. 23, 2009 (EP) .................................... 09180609

(51) Int. Cl.
C08L 23/12 (2006.01)
C08K 5/09 (2006.01)
C08J 9/00 (2006.01)
C08K 5/053 (2006.01)
C08K 5/521 (2006.01)
C08L 23/14 (2006.01)
C08K 5/092 (2006.01)
C08J 5/18 (2006.01)
C08F 10/06 (2006.01)

(52) U.S. Cl.
CPC ............... *C08J 5/18* (2013.01); *C08J 2323/14* (2013.01); *C08F 10/06* (2013.01)
USPC ........................................... 521/81; 521/134

(58) Field of Classification Search
USPC ..................................................... 521/81
See application file for complete search history.

(56) References Cited

U.S. PATENT DOCUMENTS

| 4,236,884 | A | * | 12/1980 | Schott, Jr. .................... 425/72.1 |
| 4,314,039 | A | * | 2/1982 | Kawai et al. .................... 524/108 |
| 4,552,930 | A | * | 11/1985 | Hirota et al. ................ 525/333.8 |
| 5,234,879 | A | | 8/1993 | Garoff et al. |
| 2004/0175591 | A1* | | 9/2004 | Jaaskelainen et al. ........ 428/515 |
| 2007/0197743 | A1* | | 8/2007 | Jaaskelainen et al. .......... 526/65 |
| 2008/0227877 | A1* | | 9/2008 | Stadlbauer et al. ............. 521/79 |

FOREIGN PATENT DOCUMENTS

| EP | 0787750 A2 | 8/1997 |
| EP | 0879830 A1 | 11/1998 |
| EP | 0887379 A1 | 12/1998 |
| EP | 0890612 A2 | 1/1999 |
| EP | 1580207 A1 | 9/2005 |
| EP | 1842872 A2 | 10/2007 |
| WO | 9212182 A1 | 7/1992 |
| WO | 9219653 A1 | 11/1992 |
| WO | 9219658 A1 | 11/1992 |
| WO | 9933843 A1 | 7/1999 |
| WO | 03002639 A1 | 1/2003 |

OTHER PUBLICATIONS

Equistar "Additives: Nucleating and Clarifying agents" available online at http://www.lyondellbasell.com/techlit/techlit/Tech%20Topics/General/Nucleating%20and%20Clarifying%20Agents.pdf. Available since at least Oct. 2009.*
Dharia, A.; Folland, R. "Properties and applications of blends of High Melt Strength PP and linear PP" Annual Technical Conference—Society of Plastics Engineers. vol. 63 p. 2156-2162. 2005.*
Borealis "Daploy(tm) HMS Polypropylene for Foam Extrusion" 2010 Borealis AG.*
Hoenig, W.D; Bosnyak, C.P.; Sehanobish, K; Van Volkenburgh, W.; Ruiz, C.; Tau, L.M. "New Polypropylene for Differentiated Blown Films" Annual Technical Conference—Society of Plastics Engineers (58th), 2000.*
Gibbons, J.A. "Extrusion" in Yam, Kit L. (2009). Wiley Encyclopedia of Packaging Technology (3rd Edition). John Wiley & Sons. Online version available at: http://www.knovel.com/web/portal/browse/display?_EXT_KNOVEL_DISPLAY_bookid=5392&VerticalID=0.*

(Continued)

Primary Examiner — Kara Boyle
Assistant Examiner — Christina Wales
(74) Attorney, Agent, or Firm — Warn Partners, P.C.

(57) ABSTRACT

Extrusion blown film comprising a polypropylene composition, said polypropylene composition comprises a random propylene copolymer, a high melt strength polypropylene, a polypropylene and optionally a clarifier, wherein • the random propylene copolymer comprises units derived from propylene and at least another $C_2$ to $C_{20}$ α-olefin, • the high melt strength polypropylene has a branching index g' of less than 1.0, the polypropylene (B) has a $MFR_2$ (230° C.) of at least 400 g/10 min, • the clarifier comprises at least one α-nucleating agent, and wherein further • the branching index g' of the random propylene copolymer and the branching index g' of the polypropylene are higher than the branching index g' of the high melt strength polypropylene, • the random propylene copolymer has lower melt flow rate $MFR_2$ (230° C.) than the polypropylene, • the extrusion melt blown film and/or the polypropylene composition (i) fulfill(s) the equation (I) Tm−Tc<30 (I) wherein Tm is the melting tempareture [° C.] making up more than 50% of the total melting enthalpy Hm of the extrusion melt blown film or of the polypropylene composition; Tc is the crystallization temperature [° C.] of the extrusion melt blown film or of the polypropylene composition; and/or (ii) has (have) a melt flow rate $MFR_2$ (230° C.) of 1.0 to 5.5 g/10 min.

19 Claims, No Drawings

(56) References Cited

OTHER PUBLICATIONS

Lyondellbasell "Metallocene PP Homopolymer". Available online at https://polymers.lyondellbasell.com/portal/site/basell/menuitem.81bd1022b7c8ec5bbaabbd10e5548a0c/?VCMChannelID=2e0935b62ced5110VgnVCM100000646f3c14_&productQueryText=&filterType=resin&resin=20&market=&region=. Copyright 2008.*

Wiley. "The Wiley Encyclopedia of Packaging Technology, 3rd Edition" accessed at www.wiley.com/WileyCDA/WileyTitle/productCd-0470087048.html on Aug. 30, 2013.*
International Search Report and Written Opinion for International Application No. PCT/EP2010/069785 Filed Dec. 15, 2010.
Gachter/.Muller, Plastics Addities Handbook, 3rd Edition, Hanser Publishers, Munich, 1993.

* cited by examiner

BLOWNFILM GRADE SHOWING SUPERIOR STIFFNESS, TRANSPARENCY AND PROCESSING BEHAVIOUR

CROSS REFERENCE TO RELATED APPLICATIONS

This application is a National Stage of International Application No. PCT/EP2010/069788, filed Dec. 15, 2010. This application claims priority to European Patent Application No. 09180609.1 filed on Dec. 23, 2009. The disclosures of the above applications are incorporated herein by reference.

The present invention relates to new extrusion blown films and their use.

Polypropylenes succeed more and more to replace polyethylenes in many technical fields as quite often the new generation of polypropylenes have enhanced properties compared to conventional polyethylene materials. This applies also for the field of extrusion blown films where polypropylene take advantage of molecular engineering to overcome previous material shortcomings for extrusion blown film production. Nowadays it is possible to manufacture extrusion blown films on the basis of polypropylene. For instance EP 1 842 872 A2 describes blown films based on a polypropylene containing nucleating agents. However the mechanical properties could be still improved. Also the processing of such a material is still improvable.

The extrusion blow film process is very useful and efficient for the production of film (semifinished state) that can be used for all different kind of packaging. Compared to cast film process it is cheaper in the investment, less energy consuming and also very flexible in handling. When processing polypropylene the main challenges with this process are transparency and processing. It is very difficult to achieve good transparency because the polymer melt is extruded into air and blown up from inside until it has reached the required dimension. Cooling is therefore done by air (cast film has contact to so called chill-roll: cool metal surface) and at the same time a multiaxial orientation is imposed to the material (so called drawn up ratio). In order to have good processing behavior the material has to reach a good stability of the bubble created immediately after coming out of the die. To achieve a good bubble stability a certain level of melt strength is necessary. However up to now such a good melt strength was paid with high haze levels.

Accordingly the object of the present invention is to provide an extrusion blown film from a high-speed conversion process with excellent combination of stiffness, toughness and transparency.

The finding of the present invention is that the extrusion blown film must comprise a polypropylene composition comprising a branched polypropylene, like a Y/H-shaped polypropylene, i.e. a high melt strength polypropylene, and a further polypropylene with high melt flow rate.

Accordingly the present invention is directed in a first embodiment to an extrusion blown film comprising a polypropylene composition, said polypropylene composition comprises a random propylene copolymer (R-PP), a high melt strength polypropylene (HMS-PP), a polypropylene (B) and optionally a clarifier (C), wherein
(a) the random propylene copolymer (R-PP) comprises units derived from propylene and at least another $C_2$ to $C_{20}$ α-olefin,
(b) optionally the high melt strength polypropylene (HMS-PP) has a branching index g' of less than 1.0, preferably a branching index g' of 0.9 or less,
(c) the polypropylene (B) has a $MFR_2$ (230° C.) measured according to ISO 1133 of at least 400 g/10 min,
(d) the clarifier (C) comprises at least one α-nucleating agent (N), and
wherein further
(i) the random propylene copolymer (R-PP) and the polypropylene (B) are (chemically) different to the high melt strength polypropylene (HMS-PP), preferably the branching index g' of the random propylene copolymer (R-PP) and the branching index g' of the polypropylene (B) are higher than the branching index g' of the high melt strength polypropylene (HMS-PP),
(ii) the random propylene copolymer (R-PP) is (chemically) different to the polypropylene (B), preferably the random propylene copolymer (R-PP) has lower melt flow rate $MFR_2$ (230° C.) measured according to ISO 1133 than the polypropylene (B),
(iii) the extrusion melt blown film and/or the polypropylene composition
(α) fulfill(s) the equation (I)

$$Tm-Tc \leq 30 \qquad (I)$$

wherein
Tm is the melting temparetaure [° C.] making up more than 50% of the total melting enthalpy Hm of the extrusion melt blown film or of the polypropylene composition measured by DSC according to ISO 11357-3;
Tc is the crystallization temperature [° C.] of the extrusion melt blown film or of the polypropylene composition measured by DSC according to ISO 11357-3
and/or
(β) has (have) a melt flow rate $MFR_2$ (230° C.) measured according to ISO 1133 of 1.0 to 5.5 g/10 min.

Preferably the above defined extrusion blown film and/or the above defined polypropylene composition has (have)
(a) a strain hardening factor (SHF) of 1.2 to 3.0 measured at a strain rate of $3.0 \, s^{-1}$ and a Hencky strain of 3.0,
and/or
(b) a gel content determined as the xylene hot insoluble (XHI) fraction of equal or below 1.0 wt.-%.

Alternatively the present invention is directed in a second embodiment to an extrusion blown film comprising a polypropylene composition, said polypropylene composition comprises a random propylene copolymer (R-PP), a high melt strength polypropylene (HMS-PP), a polypropylene (B) and optionally a clarifier (C), wherein
(a) the random propylene copolymer (R-PP) comprises units derived from propylene and at least another $C_2$ to $C_{20}$ α-olefin,
(b) optionally the high melt strength polypropylene (HMS-PP) has a branching index g' of less than 1.0, preferably a branching index g' of 0.9 or less,
(c) the polypropylene (B) has a $MFR_2$ (230° C.) measured according to ISO 1133 of at least 400 g/10 min,
(d) the clarifier (C) comprises at least one α-nucleating agent (N), and
wherein further
(i) the random propylene copolymer (R-PP) and the polypropylene (B) are (chemically) different to the high melt strength polypropylene (HMS-PP), preferably the branching index g' of the random propylene copolymer (R-PP) and the branching index g' of the polypropylene (B) are higher than the branching index g' of the high melt strength polypropylene (HMS-PP),
(ii) the random propylene copolymer (R-PP) is (chemically) different to the polypropylene (B), preferably the random propylene copolymer (R-PP) has lower melt flow rate MFR$_2$ (230° C.) measured according to ISO 1133 than the polypropylene (B), (iii) the extrusion melt blown film and/or the polypropylene composition has (have)
(a) a strain hardening factor (SHF) of 1.2 to 3.0 measured at a strain rate of 3.0 s$^{-1}$ and a Hencky strain of 3.0, and/or
(b) a gel content determined as the xylene hot insoluble (XHI) fraction of equal or below 1.0 wt.-%.

Preferably the extrusion blown film and/or the polypropylene composition of the second embodiment
(a) fulfill(s) the equation (I)

$$Tm-Tc \leq 30 \quad (I)$$

wherein
Tm is the melting temparetaure [° C.] making up more than 50% of the total melting enthalpy Hm of the extrusion melt blown film or of the polypropylene composition measured by DSC according to ISO 11357-3;
Tc is the crystallization temperature [° C.] of the extrusion melt blown film or of the polypropylene composition measured by DSC according to ISO 11357-3
and/or
(b) has (have) a melt flow rate MFR$_2$ (230° C.) measured according to ISO 1133 of 1.0 to 5.5 g/10 min.

Preferably the extrusion blown film comprises as a polymer composition only the polypropylene compositions as defined above (in the first and second embodiment). Thus the extrusion blown film may comprise further additives but no further polymers as those being part of the polypropylene composition. Additionally the polypropylene compositions as defined above (in the first and second embodiment) comprise in a preferred embodiment as polymer components only the random propylene copolymer (R-PP), the polypropylene (B) and the high melt strength polypropylene (HMS-PP) as defined above and in further detail below. Therefore also the final extrusion blown film comprises in a preferred embodiment only the random propylene copolymer (R-PP), the polypropylene (B) and the high melt strength polypropylene (HMS-PP) as defined instant invention as polymer components.

It has been surprisingly found out that such a extrusion blown film has superior properties compared to known extrusion blown films. The extrusion blown film of the present invention is featured by exceptional low haze values, good stiffness and good processing parameters (see table 1).

In the following the present invention is described in more detail.

One essential requirement of the inventive extrusion blown film is the specific correlation between melting temperature Tm and the crystallization temperature Tc of the extrusion blown film and/or of the polypropylene composition being part of said film. Accordingly it is preferred that the extrusion blown film and/or the polypropylene composition being part of said film fulfills the equation (I), more preferably the equation (Ia), yet more preferably the equation (Ib)

$$Tm-Tc \leq 30 \quad (I),$$

$$Tm-Tc \leq 25 \quad (Ia),$$

$$Tm-Tc \leq 22 \quad (Ib),$$

wherein
Tm is the melting temperature [° C.] making up more than 50% of the total melting enthalpy Hm of the extrusion melt blown film or of the polypropylene composition measured by DSC according to ISO 11357-3;
Tc is the crystallization temperature [° C.] of the extrusion melt blown film or of the polypropylene composition measured by DSC according to ISO 11357-3

Additionally or alternatively the extrusion blown film and/or the polypropylene composition being part of said film is featured by a specific melt flow rate. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as MFR$_2$ (230° C.). Accordingly, it is preferred that the inventive extrusion blown film and/or the polypropylene composition being part of said film has (have) an MFR$_2$ (230° C.) of at least 0.5 g/10 min, like at least 1.0 g/10 min, more preferably in the range of 1.5 to 5.5 g/10 min, still more preferably in the range of 1.5 to 4.5 g/10 min, yet more preferably of 1.5 to 4.0 g/10 min, still yet more preferably of 2.0 to 4.0 g/10 min.

Further, as stated above the new extrusion blown film, i.e. the polypropylene composition being part of said film, must comprise a high melt strength polypropylene (HMS-PP). Such polymer types improve the melt strength of the polypropylene composition. Accordingly it is preferred that the extrusion blown film and/or the polypropylene composition being part of said film is (are) further characterized by a strain hardening behavior. Thus it is appreciated that the extrusion blown film and/or the polypropylene composition being part of said film has (have) a strain hardening factor (SHF) of 1.2 to 3.0, more preferably of 1.4 to 2.8, yet more preferably of 1.5 to 2.7, measured at a strain rate of 3.0 s$^{-1}$ and a Hencky strain of 3.0. The exact measuring method is defined in the example section.

Further the extrusion blown film and/or the polypropylene composition being part of said film can be additionally defined by the gel content. The gel content is a good indicator for the chemical modification of the extrusion blown film, the polypropylene composition or their components. Accordingly the extrusion blown film and/or the polypropylene composition being part of said film is (are) featured by relatively moderate gel content, i.e. of not more than 1.00 wt.-%, even more preferred of not more than 0.80 wt.-%, still more preferred of not more than 0.50 wt.-% determined as the relative amount of polymer insoluble in boiling xylene (xylene hot insoluble fraction, XHI). On the other hand the extrusion blown film and/or the polypropylene composition being part of said film must comprise a certain amount of high melt strength polypropylene (HMS-PP). Accordingly the amount of gel content in the extrusion blown film and/or in the polypropylene composition being part of said film is preferably more than 0.15 wt.-%, more preferably of at least 0.27 wt.-%. Thus a preferred range for the gel content of the extrusion blown film and/or the polypropylene composition being part of said film is 0.05 to 0.90 wt.-%, like 0.15 to 0.90 wt.-%, more preferred 0.26 to 0.8 wt.-%.

Further it is appreciated that the extrusion blown film and/or the polypropylene composition being part of said film is (are) free of any elastomeric polymer component, like an ethylene propylene rubber. In other words the polypropylene composition being part of the extrusion blown film shall be not a heterophasic polypropylene composition, i.e. a system consisting of a polypropylene matrix in which an elastomeric phase is dispersed. Such systems are featured by a rather high xylene cold soluble content. Of course also the extrusion blown film as a whole is preferably free of a heterophasic polypropylene composition. Accordingly, the extrusion blown film and/or the polypropylene composition being part of said film differ(s) from such a heterophasic system by a rather low xylene cold soluble (XCS) content. Therefore the extrusion blown film and/or the polypropylene composition being part of said film has (have) preferably a xylene cold soluble fraction (XCS) of not more than 15.0 wt-%, more preferably of not more than 14.0 wt.-%, yet more preferably of not more than 12.0 wt.-%, like not more than 11.5 wt.-%.

Further the extrusion blown film and/or the polypropylene composition being part of said film can be specified by the amount of comonomer units other than propylene within the extrusion blown film and the polypropylene composition being part of said film, respectively. Accordingly it is appreciated that the amount of units derived from $C_2$ to $C_{20}$ α-olefins other than propylene is not more than 7.0 wt.-%, preferably not more than 6.0 wt.-%, like not more than 5.5 wt.-%, in the extrusion blown film and/or the polypropylene composition being part of said film.

In the following the present extrusion blown film is further defined by the polymer components within the polypropylene composition.

The random propylene copolymer (R-PP) comprises units derived from propylene and at least another $C_2$ to $C_{20}$ α-olefin, preferably at least another $C_2$ to $C_{10}$ α-olefin. Accordingly the random propylene copolymer (R-PP) comprises units derived from propylene and at least another α-olefin selected from the group consisting of ethylene $C_4$ α-olefin, $C_5$ α-olefin, $C_6$ α-olefin, $C_7$ α-olefin, $C_8$ α-olefin, $C_9$ α-olefin and $C_{10}$ α-olefin. More preferably the random propylene copolymer (R-PP) comprises units derived from propylene and at least another α-olefin selected from the group consisting of ethylene, 1-butene, 1-pentene, 1-hexene, 1-heptene, 1-octene, 1-nonene and 1-decene, wherein ethylene, 1-butene and 1-hexene are preferred. It is in particular preferred that the random propylene copolymer (R-PP) consists of units derived from propylene and ethylene. The amount of units derived from $C_2$ to $C_{20}$ α-olefins other than propylene in the random propylene copolymer (R-PP) is in the range of 1.0 to 7.0 wt.-%, more preferably 1.5 to 6.0 wt.-%, still more preferably 2.0 to 5.5 wt.-%.

Preferably the random propylene copolymer (R-PP) is isotactic. Accordingly it is appreciated that the random propylene copolymer (R-PP) has a rather high pentad concentration, i.e. higher than 90 mol-%, more preferably higher than 92 mol-%, still more preferably higher than 93 mol-% and yet more preferably higher than 95 mol-%, like higher than 99 mol-%.

One requirement in the present invention is that units derived from $C_2$ to $C_{20}$ α-olefins other than propylene within the propylene copolymer (R-PP) are randomly distributed. The randomness indicates the amount of isolated comonomer units, i.e. those which have no other comonomer units in the neighbour, compared to the total amount of comonomers in the polymer chain. In a preferred embodiment, the randomness of the random propylene copolymer (R-PP) is at least 30%, more preferably at least 50%, even more preferably at least 60%, and still more preferably at least 65%.

Further it is appreciated that the xylene soluble content of the random propylene copolymer (R-PP) is a rather low. Accordingly the random propylene copolymer (R-PP) has preferably a xylene cold soluble fraction (XCS) measured according to ISO 6427 (23° C.) of not more than 14.0 wt-%, more preferably of not more than 13.0 wt.-%, yet more preferably of not more than 12.0 wt.-%, like not more than 11.5 wt.-%. Thus a preferred range is 1.0 to 14.0 wt.-%, more preferred 1.0 to 13.0 wt.-%, still more preferred 1.2 to 11.0 wt.-%.

The random propylene copolymer (R-PP) can be unimodal or multimodal, like bimodal in view of the molecular weight distribution and/or the comonomer content distribution.

When the random propylene copolymer (R-PP) is unimodal with respect to the molecular weight distribution and/or comonomer content, it may be prepared in a single stage process e.g. as slurry or gas phase process in a slurry or gas phase reactor. Preferably, the unimodal the random propylene copolymer (R-PP) is polymerized as a slurry polymerization. Alternatively, the unimodal the random propylene copolymer (R-PP) may be produced in a multistage process using at each stage process conditions which result in similar polymer properties.

The expression "multimodal" or "bimodal" used herein refers to the modality of the polymer, i.e.
the form of its molecular weight distribution curve, which is the graph of the molecular weight fraction as a function of its molecular weight,
or more preferably
the form of its comonomer content distribution curve, which is the graph of the comonomer content as a function of the molecular weight of the polymer fractions.

As will be explained below, the polymer components of the the random propylene copolymer (R-PP) can be produced in a sequential step process, using reactors in serial configuration and operating at different reaction conditions. As a consequence, each fraction prepared in a specific reactor will have its own molecular weight distribution and/or comonomer content distribution.

When the distribution curves (molecular weight or comonomer content) from these fractions are superimposed to obtain the molecular weight distribution curve or the comonomer content distribution curve of the final polymer, these curves may show two or more maxima or at least be distinctly broadened when compared with curves for the individual fractions. Such a polymer, produced in two or more serial steps, is called bimodal or multimodal, depending on the number of steps.

Accordingly the random propylene copolymer (R-PP) may be multimodal, like bimodal, in view of the comonomer content and/or molecular weight. It is in particular appreciated that the the random propylene copolymer (R-PP) is multimodal, like bimodal, in view of the comonomer content.

Further in case the random propylene copolymer (R-PP) is of multimodal, like bimodal, character, in particular multimodal, like bimodal, in view of the comonomer content, it is appreciated that the individual fractions are present in amounts influencing the properties of the material. Accordingly it is appreciated that each of these fractions is at least present in the amount of 10 wt.-% based on the random propylene copolymer (R-PP). Accordingly in case of a bimodal system, in particular in view of the comonomer content, the split of the two fractions is roughly 50:50.

Thus in one embodiment the random propylene copolymer (R-PP) comprises two fractions which differ in their comonomer content, like ethylene content (preferably as the only comonomer in the random propylene copolymer (R-PP)), wherein the first fraction is present from 40 to 60 wt.-% and the second fraction from 60 to 40 wt.-%. In such a case the random propylene copolymer (R-PP) comprises at least two fractions, more preferably consists of two fractions, that have a comonomer content, like ethylene content, which differ of at least 2.0 wt.-%, more preferably differ of at least 2.5 wt.-%. On the other hand the difference in the comonomer content in the two fractions should be not too high, i.e. not higher than 6.0 wt.-%, preferably not higher than 5.0 wt %, to avoid any separation tendencies. Thus it is appreciated that the random propylene copolymer (R-PP) comprises at least two fractions, more preferably consists of two fractions, that have comonomer contents which differ of 2.0 to 6.0 wt.-%, more preferably of 2.5 to 5.0 wt.-%. Accordingly in one embodiment the random propylene copolymer (R-PP) consists of a first fraction being a propylene homopolymer and a second fraction being a random propylene copolymer having a comonomer content, preferably ethylene content, of at least 2.0 wt.-%, more preferably of at least 3.0 wt.-%, like at least 3.5 wt.-%.

As comes already apparent from the wording used in the instant invention the random propylene copolymer (R-PP) is not only (chemically) different to the propylene (B) but also (chemically) different to the high melt strength polypropylene (HMS-PP). One essential difference is that the random propylene copolymer (R-PP) (compared to the high melt strength polypropylene (HMS-PP)) is unbranched. In other words the random propylene copolymer (R-PP) has preferably a higher branching index g' compared to the branching index g' of the high melt strength polypropylene (HMS-PP), more preferably the branching index g' of the random propylene copolymer (R-PP) is at least 0.95, like 1.0. A further distinguishing feature between the high melt strength polypropylene (HMS-PP) and the random propylene copolymers(R-PP) is preferably the gel content expressed in the amount of the xylene hot insoluble fraction (XHI). Accordingly the random propylene copolymer (R-PP) has a gel content below 0.15 wt.-%, more preferably has no detectable gel content.

In particular suitable random propylene copolymers (R-PP) are those as for instance described in EP 1 580 207 A1 and WO 2003/002639 A1.

As stated above, the polypropylene composition being part of the inventive extrusion blown film must at least comprise —as polymer components—a random propylene copolymer (R-PP), a polypropylene (B) and a high melt strength polypropylene (HMS-PP). The three components must be chosen in such a way that inter alia the required $MFR_2$ (230° C.) of at least 0.5 g/10 min, like at least 1.0 g/10 min, for extrusion blown film and/or for the polypropylene composition is (are) met. In principle visbreaking is an option to increase the melt flow rate of the polypropylene composition. However even though it has been discovered that visbreaking of a polypropylene composition may improve the haze and gloss of the extrusion blown films, it has been now surprisingly found out that the increase of the melt flow rate by the incorporation of a viscous polypropylene, i.e. polypropylene (B), leads to much better properties. Without be bonded to the theory, it is believed that the addition of a polypropylene with rather high melt flow rate to a mixture of non-visbroken random propylene copolymer (R-PP) and a high melt strength polypropylene (HMS-PP) leads to much better haze and gloss properties compared to a visbroken polypropylene of random propylene copolymer (R-PP) and optionally high melt strength polypropylene (HMS-PP), since the viscous polypropylene may improve the surface of the extrusion blown film and therewith the overall transparency of said film. Accordingly it is preferred that neither the polypropylene composition as whole nor the random propylene copolymer (R-PP) has been visbroken.

Accordingly, it is appreciated that the random propylene copolymer (R-PP) has a $MFR_2$ (230° C.) of at least 0.5 g/10 min, more preferably in the range of 0.8 to 6.0 g/10 min, yet more preferably of 1.2 to 4.5 g/10 min, like 1.5 to 4.0 g/10 min.

The preparation of the random propylene copolymer (R-PP) will be defined in more detail below.

As a further essential requirement of the present invention a high melt strength polypropylene (HMS-PP) must be used. Such polymer types are characterized by a certain degree of branching. Possible high melt strength polypropylenes (HMS-PP) are so called Y/H-polypropylenes and for instance described in EP 0 787 750, i.e. single branched polypropylene types (Y polypropylenes having a backbone with a single long side-chain and an architecture resembles a "Y") and polypropylene types in which polymer chains are coupled with a bridging group (an architecture resembles a "H"). Such polypropylenes are characterized by rather high melt strength. A parameter of the degree of branching is the branching index g'. The branching index g' correlates with the amount of branches of a polymer. The branching index g' is defined as $g'=[IV]_{br}/[IV]_{lin}$ in which g' is the branching index, $[IV]_{br}$ is the intrinsic viscosity of the branched polypropylene and $[IV]_{lin}$ is the intrinsic viscosity of the linear polypropylene having the same weight average molecular weight (within a range of ±10%) as the branched polypropylene. Thereby, a low g'-value is an indicator for a high branched polymer. In other words, if the g'-value decreases, the branching of the polypropylene increases. Reference is made in this context to B. H. Zimm and W. H. Stockmeyer, J. Chem. Phys. 17,1301 (1949). This document is herewith included by reference. Thus it is preferred that the branching index g' of the high melt strength polypropylene (HMS-PP) shall be less than 1.0, more preferably equal or less than 0.9, like less than 0.8. In another preferred embodiment the branching index g' of the high melt strength polypropylene (HMS-PP) shall be preferably less than 0.7.

The high degree of branching of the high melt strength polypropylene (HMS-PP) contributes also to its melt strength. Accordingly it is preferred that the high melt strength polypropylene (HMS-PP) is further characterized by a strain hardening behavior. Thus it is appreciated that the high melt strength polypropylene (HMS-PP) has strain hardening factor (SHF) of 3.5 to 30.0, more preferably of 5.0 to 20.0, measured at a strain rate of $3.0\ s^{-1}$ and a Hencky strain of 3.0.

Such a high melt strength polypropylene (HMS-PP) is preferably obtained by modifying, i.e. chemically modifying, a polypropylene. Such a modification is necessary to achieve the branching structure and/or the strain hardening phenomena of the high melt strength polypropylene (HMS-PP). Such a modification has also influence on the gel content of the high melt strength polypropylene (HMS-PP). Accordingly it is justified to define the high melt strength polypropylene (HMS-PP) further and/or alternatively by its gel content. Thus it is appreciated that the high melt strength polypropylene (HMS-PP) is featured by a relatively moderate gel content, i.e. of not more than 1.00 wt.-%, even more preferred of not more than 0.80 wt.-%, still more preferred of not more than 0.50 wt.-% determined as the relative amount of polymer insoluble in boiling xylene (xylene hot insoluble fraction, XHI). On the other hand the high melt strength polypropylene (HMS-PP) may show a certain degree of branching and thus a certain amount of gel content, i.e. of at least 0.15 wt.-%, more preferably of at least 0.27 wt.-%. Thus a preferred range for the gel content of the high melt strength polypropylene (HMS-PP) is 0.05 to 0.90 wt.-%, more preferred 0.26 to 0.8 wt.-%.

Additionally it is preferred that in the melt strength polypropylene (HMS-PP) has an $MFR_2$ (230° C.) in a range of 1.0 to 10.0 g/10 min, more preferably of 4.0 to 8.5 g/10 min, still more preferably of 6.0 to 8.0 g/10 min.

Preferably, the high melt strength polypropylene (HMS-PP) has a density of at least 850 kg/m³, more preferably of at least 875 kg/m³ and most preferably of at least 900 kg/m³.

Further, preferably, the high melt strength polypropylene (HMS-PP) has a density of not more than 950 kg/m³, more preferably of not more than 925 kg/m³ and most preferably of not more than 910 kg/m³.

Preferably, the high melt strength polypropylene (HMS-PP) has a melting point of at least 140° C., more preferably of at least 150° C. and most preferably of at least 160° C.

As stated above, the melt strength polypropylene (HMS-PP) is preferably a modified polypropylene. Accordingly the melt strength polypropylene (HMS-PP) can be further defined by the way obtained. Thus the melt strength polypropylene (HMS-PP) is preferably the result of treating an unmodified polypropylene (A) with thermally decomposing radical-forming agents and/or with ionizing radiation. However in such a case a high risk exists that the polypropylene (A) is degraded, which is detrimental. Thus it is preferred that the modification is accomplished by the use of bifunctionally unsaturated monomer(s) and/or multifunctionally unsaturated low molecular weight polymer(s) as chemically bound bridging unit(s). A suitable method to obtain the melt strength polypropylene (HMS-PP) is for instance disclosed in EP 0 787 750, EP 0 879 830 A1 and EP 0 890 612 A2. All documents are herewith included by reference. Thereby, the amount of peroxide is preferably in the range of 0.05 to 3.00 wt.-% based on the unmodified polypropylene (A).

Accordingly in one preferred embodiment the high melt strength polypropylene (HMS-PP) comprises units derived from
(i) propylene and
(ii) bifunctionally unsaturated monomer(s) and/or multifunctionally unsaturated low molecular weight polymer(s).

"Bifunctionally unsaturated or multifunctionally unsaturated" as used above means preferably the presence of two or more non-aromatic double bonds, as in e.g. divinylbenzene or cyclopentadiene or polybutadiene. Only such bi- or multifunctionally unsaturated compounds are used which can be polymerized preferably with the aid of free radicals. The unsaturated sites in the bi- or multifunctionally unsaturated compounds are in their chemically bound state not actually "unsaturated", because the double bonds are each used for a covalent bond to the polymer chains of the polypropylene (A).

Reaction of the bifunctionally unsaturated monomer(s) and/or multifunctionally unsaturated low molecular weight polymer(s), preferably having a number average molecular weight $(M_n) \leq 10000$ g/mol, synthesized from one and/or more unsaturated monomers with the propylene polymer composition may be performed in the presence of a thermally free radical forming agent, e. g. decomposing free radical-forming agent, like a thermally decomposable peroxide and/or ionizing radiation or microwave radiation.

The bifunctionally unsaturated monomers may be
divinyl compounds, such as divinylaniline, m-divinylbenzene, p-divinylbenzene, divinylpentane and divinylpropane;
allyl compounds, such as allyl acrylate, allyl methacrylate, allyl methyl maleate and allyl vinyl ether;
dienes, such as 1,3-butadiene, chloroprene, cyclohexadiene, cyclopentadiene, 2,3-dimethylbutadiene, heptadiene, hexadiene, isoprene and 1,4-pentadiene;
aromatic and/or aliphatic bis (maleimide) bis (citraconimide) and mixtures of these unsaturated monomers.

Especially preferred bifunctionally unsaturated monomers are 1,3-butadiene, isoprene, dimethyl butadiene and divinylbenzene.

The multifunctionally unsaturated low molecular weight polymer, preferably having a number average molecular weight $(M_n) \leq 10000$ g/mol may be synthesized from one or more unsaturated monomers.

Examples of such low molecular weight polymers are
polybutadienes, especially where the different microstructures in the polymer chain, i.e. 1,4-cis, 1,4-trans and 1,2-(vinyl) are predominantly in the 1,2-(vinyl) configuration
copolymers of butadiene and styrene having 1,2-(vinyl) in the polymer chain.

A preferred low molecular weight polymer is polybutadiene, in particular a polybutadiene having more than 50.0 wt.-% of the butadiene in the 1,2-(vinyl) configuration.

The high melt strength polypropylene (HMS-PP) may contain more than one bifunctionally unsaturated monomer and/or multifunctionally unsaturated low molecular weight polymer. Even more preferred the amount of bifunctionally unsaturated monomer(s) and multifunctionally unsaturated low molecular weight polymer(s) together in the high melt strength polypropylene (HMS-PP) is 0.01 to 10.0 wt.-% based on said high melt strength polypropylene (HMS-PP).

As stated above it is preferred that the bifunctionally unsaturated monomer(s) and/or multifunctionally unsaturated low molecular weight polymer(s) are used in the presence of a thermally decomposing free radical-forming agent.

Peroxides are preferred thermally decomposing free radical-forming agents. More preferably the thermally decomposing free radical-forming agents are selected from the group consisting of acyl peroxide, alkyl peroxide, hydroperoxide, perester and peroxycarbonate.

The following listed peroxides are in particular preferred:
Acyl peroxides: benzoyl peroxide, 4-chlorobenzoyl peroxide, 3-methoxybenzoyl peroxide and/or methyl benzoyl peroxide;
Alkyl peroxides: allyl t-butyl peroxide, 2,2-bis(t-butylperoxybutane), 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy) cyclohexane, t-amyl peroxide, t-butylcumyl peroxide, t-butyl peroxide and/or 1-hydroxybutyl n-butyl peroxide;
Peresters and peroxy carbonates: butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate;

or mixtures of these above listed free radical-forming agents.

The unmodified polypropylene (A) to prepare such a high melt strength polypropylene (HMS-PP) has preferably a $MFR_2$ (230° C.) in a range of 0.05 to 45.00 g/10 min. More preferably the $MFR_2$ (230° C.) is in a range of 0.05 to 35.00 g/10 min in case the unmodified polypropylene (A) is a homopolymer. On the other hand the $MFR_2$ (230° C.) is in a range of 0.05 to 45.00 g/10 min in case the unmodified polypropylene (A) is a copolymer.

Preferably the unmodified polypropylene (A) is a homopolymer.

The expression propylene homopolymer as used throughout the instant invention relates to a polypropylene that consists substantially, i.e. of more than 99.5 wt.-%, still more preferably of at least 99.7 wt.-%, like of at least 99.8 wt.-%, of propylene units. In a preferred embodiment only propylene units in the propylene homopolymer are detectable. The comonomer content can be determined with FT infrared spectroscopy, as described below in the examples.

Preferably the high melt strength polypropylene (HMS-PP) is produced from the unmodified polypropylene (A) as defined above under process conditions as defined in detail below.

As a further polymer component a viscous polypropylene is required. As stated above this polypropylene (B) must be chemically different to the random propylene copolymer (R-PP). Of course the propylene (B) is also preferably chemically different to the high melt strength polypropylene (HMS-PP).

One essential difference between the polypropylene (B) and the high melt strength polypropylene (HMS-PP) is that the polypropylene (B) is an unbranched polypropylene whereas the high melt strength polypropylene (HMS-PP) shows a branching structure. In other words the polypropylene (B) has preferably a higher branching index g' compared to the branching index g' of the high melt strength polypropylene (HMS-PP), more preferably the branching index g' of the polypropylene (B) is at least 0.95, like 1.0. A further distinguishing feature between the high melt strength polypropylene (HMS-PP) and the polypropylene (B) is preferably the gel content expressed in the amount of the xylene hot insoluble fraction (XHI). Accordingly the polypropylene (B) has a gel content below 0.15 wt.-%, more preferably has no detectable gel content. A further difference between the polypropylene (B) and the high melt strength polypropylene (HMS-PP) is preferably that they differ in the melt flow rate $MFR_2$ (230° C.), i.e. the polypropylene (B) has a higher $MFR_2$ (230° C.) than the high melt strength polypropylene (HMS-PP).

The difference between the polypropylene (B) and the random propylene copolymer (R-PP) is preferably that they differ in the melt flow rate $MFR_2$ (230° C.), i.e. the polypropylene (B) has a higher $MFR_2$ (230° C.) than the random propylene copolymer (R-PP). Accordingly it is appreciated that the polypropylene (B) has a $MFR_2$ (230° C.) of at least 400 g/10 min, more preferably at least 430 g/10 min, like at least 450 g/10 min, yet more preferably at least 800 g/10 min, like about 1,200 g/10 min On the other hand the hand the polypropylene (B) should be not to viscous not to deteriorate the stiffness of the final film. Accordingly it is appreciated that the polypropylene (B) has a $MFR_2$ (230° C.) in the range of 400 to 3,000 g/10 min, more preferably in the range of 420 to 2,000 g/10 min, like 440 to 1,500 g/10 min.

Further the molecular weight distribution (MWD) is desirable rather low. Accordingly it is preferred that the Mw/Mn (MWD) of the polypropylene (B) is below 4.5, like from 0.5 to 4.5, more preferably below 4.0, like from 0.5 to 4.0.

Additionally it is appreciated that the polypropylene (B) has xylene cold soluble fraction (XCS) of not more than 5.0 wt-%, like 0.5 to 4.5 wt.-%, more preferably of not more than 3.5 wt.-%, like 0.5 to 3.0 wt.-%.

The polypropylene (B) as defined throughout the present invention can be obtained by visbreaking as defined in detail below or by polymerization of propylene for instance in the presence of a metallocene catalyst. One suitable polypropylene obtained by metallocene polymerization technology is the commercial product MF650W of Basell. However it is appreciated in the present application that the polypropylene is in particular obtained by visbreaking.

Accordingly, to achieve the desired MFR range, the polypropylene (B) is typically prepared by polymerizing propylene and optional comonomers to a relatively high molecular weight, which is then treated with peroxide to reduce its molecular weight to a desired average ("visbroken"). Accordingly the polypropylene (B) is preferably a visbroken polypropylene.

More preferably the initial polypropylene used for the preparation of the polypropylene (B) is chosen in such a manner that the visbreaking ratio (final $MFR_2$ (230° C.)/initial $MFR_2$ (230° C.)) is 3.5 to 40.0, more preferably 4.0 to 30.0, wherein "initial $MFR_2$ (230° C.)" is the $MFR_2$ (230° C.) of the polypropylene before visbreaking and "final $MFR_2$ (230° C.)" is the $MFR_2$ (230° C.) of the polypropylene (B).

The preparation of the polypropylene (B) will be defined in more detail below.

Further, the polypropylene (B) can be a propylene copolymer, like a random propylene copolymer (B') or a propylene homopolymer (B"), the latter being preferred. In case polypropylene (B) is a random propylene copolymer (B'), the copolymer (B') comprises preferably units derived from propylene and at least another $C_2$ to $C_{20}$ α-olefin, preferably at least another $C_2$ to $C_{10}$ α-olefin. Accordingly such a random propylene copolymer (B') comprises units derived from propylene and at least another α-olefin selected from the group consisting of ethylene, 1-butene, 1-pentene, 1-hexene, 1-heptene, 1-octene, 1-nonene and 1-decene, wherein ethylene, 1-butene and 1-hexene are preferred. It is in particular preferred that such a random propylene copolymer (B') consists of units derived from propylene and ethylene. The amount of units derived from $C_2$ to $C_{20}$ α-olefins other than propylene in the random propylene copolymer (B') is in the range of 1.0 to 7.0 wt.-%, more preferably 1.5 to 6.0 wt.-%, still more preferably 2.0 to 5.5 wt.-%.

Preferably the polypropylene (B) is isotactic. Accordingly it is appreciated that the polypropylene (B) has a rather high pentad concentration, i.e. higher than 90 mol-%, more preferably higher than 92 mol-%, still more preferably higher than 93 mol-% and yet more preferably higher than 95 mol-%, like higher than 99 mol-%.

Additionally it is preferred that the polypropylene composition being part of the inventive extrusion blown film comprises a clarifier (C) comprising at least one α-nucleating agent (N). Thus as β-nucleating agents negatively influences α-nucleating effect (of the α-nucleating agent) it is preferred that the clarifier (C),the polypropylene composition, and/or the final extrusion blown film is (are) (essentially) free of β-nucleating agents. Thus even more preferably the clarifier (C) consists of at least one α-nucleating agent (N). Accordingly the clarifier (C) may comprise, preferably consists of, one, two or three α-nucleating agent(s) (N). However it is appreciated that the clarifier (C) is a α-nucleating agent (N).

In principle any α-nucleating agent (N) can be used.

Examples of suitable α-nucleating agents are selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene)sorbitol), nonitol, 1,2,3,-trideoxy-4,6:5,7-bis-O-[(4-propylphenyl)methylene]-nonitol, and
(iii) salts of diesters of phosphoric acid, e.g. sodium 2,2'-methylenebis (4,6,-di-tert-butylphenyl) phosphate or aluminium-hydroxy-bis[2,2'-methylene-bis(4,6-di-t-butylphenyl)phosphate], and
(iv) vinylcycloalkane polymer and vinylalkane polymer.

Such additives are generally commercially available and are described, for example, in Gächter/Müller, Plastics Additives Handbook, $3^{rd}$ Edition, Hanser Publishers, Munich, 1993.

The nucleating agent content of the polypropylene composition is preferably up to 5 wt.-%. In a preferred embodiment, the polypropylene composition of the present invention contain from 0.001 to 1.0 wt.-%, preferably from 0.005 to 0.60 wt.-%, of a α-nucleating, in particular dibenzylidenesorbitol (e.g. 1,3:2,4 dibenzylidene sorbitol) or a dibenzylidenesorbitol derivative, preferably dimethyldibenzylidenesorbitol (e.g. 1,3:2,4 di(methylbenzylidene) sorbitol) and/or nonitol, 1,2,3,-trideoxy-4,6:5,7-bis-O-[(4-propylphenyl)methylene]-nonitol.

The most preferred α-nucleating is nonitol, 1,2,3, -trideoxy-4,6:5,7-bis-O-[(4-propylphenyl)methylene]-nonitol. Accordingly in a especially preferred embodiment the clarifier (C) comprises, even more preferred consists of, nonitol, 1,2,3, -trideoxy-4,6:5,7-bis-O-[(4-propylphenyl)methylene]-nonitol.

In case the α-nucleating agents are polymeric α-nucleating agents selected from the group consisting of vinylcycloalkane polymers and vinylalkane polymers, these polymeric nucleating agents are either accomplished by a special reactor technique, where the catalyst is prepolymerized with monomers like e.g. vinylcyclohexane (VCH), or by blending the polypropylene composition with the vinylcycloalkane polymer or vinylalkane polymer. These methods are described in greater detail in e.g. EP 0 316 187 A2 and WO 99/24479

To obtain especially good results the required components as defined above may be present in specific amounts within the new polypropylene composition of the inventive extrusion blown film. Thus it is preferred that the polypropylene composition according to the instant invention comprises
(a) 50.0 to 92.0 wt.-%, more preferably 60.0 to 90.0 wt.-%, yet more preferably 65.0 to 90.0 wt.-%, of the random propylene copolymer (R-PP),
(b) 5.0 to 26.0 wt.-%, more preferably 6.0 to 18.0 wt.-%, yet more preferably 6.5 to 16.0 wt.-%, of the high melt strength polypropylene (HMS-PP),
(c) 1.0 to 15.0 wt.-%, more preferably 1.5 to 17.0 wt.-%, yet more preferably 2.0 to 10.0 wt.-%, of the polypropylene (B), and
(d) 0.01 to 5.0 wt.-%, more preferably 0.02 to 1.0 wt.-%, yet more preferably 0.03 to 0.7 wt.-%, of the clarifier (C), based on the total polypropylene composition.

The polypropylene composition of the inventive extrusion blown film may comprise further components. However it is preferred that the polypropylene composition comprises as polymer components only the random propylene copolymer (R-PP), the polypropylene (B) and the high melt strength polypropylene (HMS-PP) as defined above. Accordingly the amounts of the random propylene copolymer (R-PP), the polypropylene (B), the high melt strength polypropylene (HMS-PP) and the clarifier (C) may not result in 100 wt.-% based on the total polypropylene composition. Thus the remaining part up 100.0 wt.-% may be accomplished by further additives known in the art. However this remaining part shall be not more than 10.0 wt.-% within the total composition. For instance the inventive polypropylene composition may comprise additionally small amounts of stabilizers, acid scavengers, lubricants, fillers, antistatics, plasticizers, dyes, pigments or flame retardants. In general, these are incorporated during granulation of the pulverulent product obtained in the polymerization.

Further, as already stated above the extrusion blown film comprises as a polymer composition only the polypropylene compositions as defined in the instant invention. Thus the extrusion blown film may comprise further additives but no further polymers as those being part of the polypropylene composition.

In a preferred embodiment the extrusion blown film comprises at least 80.0 wt.-%, more preferably at least 90.0 wt.-%, yet more preferably at least 95.0 wt.-%, still more preferably consists of, the polypropylene composition as defined in the instant invention. Thus it is especially preferred that the extrusion blown film comprises as polymer components only the random propylene copolymer (R-PP), the polypropylene (B) and the high melt strength polypropylene (HMS-PP) as defined instant invention and additionally said extrusion blown film contains of the polypropylene composition as defined in the instant invention at least 80.0 wt.-%, more preferably at least 90.0 wt.-%, yet more preferably at least 95.0 wt.-%, still more preferably said extrusion blown film consists of the polypropylene composition as defined in the instant invention.

The present invention is also directed to the use of the above defined polypropylene composition. Accordingly the polypropylene composition as defined in the instant invention is used for the preparation of an extrusion blown film.

Further the present invention is directed to a packaging material comprising the extrusion blown film of the instant invention In the following the preparation of the inventive polypropylene composition is described in more detail.

The individual components used for the polypropylene composition being part of the inventive extrusion blown film are known by the person skilled in the art and thus can be readily produced by the information provided herein.

For instance the random propylene copolymer (R-PP) as defined in the instant invention may be prepared by polymerizing, in a slurry reactor, for example a loop reactor, propylene optionally together with at least another $C_2$ to $C_{20}$ α-olefin (comonomers), in the presence of a polymerization catalyst to produce a part of the random propylene copolymer (R-PP). This part is then transferred to a subsequent gas phase reactor, wherein in the gas phase reactor propylene is reacted in the presence of suitably selected other $C_2$ to $C_{20}$ α-olefin(s) (comonomers) in order to produce a further part in the presence of the reaction product of the first step. This reaction sequence provides a reactor blend of parts (i) and (ii) constituting a random propylene copolymer (R-PP). It is of course possible by the present invention that the first reaction is carried out in a gas phase reactor while the second polymerization reaction is carried out in a slurry reactor, for example a loop reactor. It is furthermore also possible to reverse the order of producing parts (i) and (ii), which has been described above in the order of first producing part (i) and then producing part (ii). The above-discussed process, comprising at least two polymerization steps, is advantageous in view of the fact that it provides easily controllable reaction steps enabling the preparation of a desired reactor blend. The polymerization steps may be adjusted, for example by appropriately selecting monomer feed, comonomer feed, hydrogen feed, temperature and pressure in order to suitably adjust the properties of the polymerization products obtained. It is in particular possible to obtain a multimodality, preferably the bimodality, of the random propylene copolymer (R-PP), with respect to the comonomer, like ethylene, distribution as well as with respect to the molecular weights and $MFR_2$ (230° C.) values during said multistage polymerization procedures.

Such a process can be carried out using any suitable catalyst for the preparation of the random propylene copolymer (R-PP). Preferably, the process as discussed above is carried out using a Ziegler-Natta catalyst, in particular a high yield Ziegler-Natta catalyst (so-called fourth and fifth generation type to differentiate from low yield, so called second generation Ziegler-Natta catalysts). A suitable Ziegler-Natta catalyst to be employed in accordance with the present invention comprises a catalyst component, a co-catalyst component and at least one electron donor (internal and/or external electron donor, preferably at least one external donor). Preferably, the catalyst component is a Ti-Mg-based catalyst component and typically the co-catalyst is an Al-alkyl based compound. Suitable catalysts are in particular disclosed in U.S. Pat. No. 5,234,879, WO 92/19653, WO 92/19658 and WO 99/33843.

Preferred external donors are the known silane-based donors, such as dicyclopentyl dimethoxy silane or cyclohexyl methyldimethoxy silane.

One embodiment of a process as discussed above is a loop-gas phase process, such as developed by Borealis, known as Borstar® technology, described for example in EP 0 887 379 A1 and WO 92/12182.

With respect to the above-mentioned preferred slurry-gas phase process, the following general information can be provided with respect to the process conditions.

Temperature of from 40 to 110° C., preferably between 60 and 100° C., in particular between 80 and 90° C., with a pressure in the range of from 20 to 80 bar, preferably 30 to 60 bar, with the option of adding hydrogen in order to control the molecular weight. The reaction product of the slurry polymerization, which preferably is carried out in a loop reactor, is then transferred to the subsequent gas phase reactor, wherein the temperature preferably is within the range of from 50 to 130° C., more preferably 80 to 100° C., at a pressure in the range of from 5 to 50 bar, preferably 15 to 35 bar, again with the option of adding hydrogen in order to control the molecular weight.

The residence time can vary in the reactor zones identified above. In embodiments, the residence time in the slurry reaction, for example the loop reactor, is in the range of from 0.5 to 5 hours, for example 0.5 to 2 hours, while the residence time in the gas phase reactor generally will be from 1 to 8 hours.

The properties of the random propylene copolymer (R-PP) produced with the above-outlined process may be adjusted and controlled with the process conditions as known to the skilled person, for example by one or more of the following process parameters: temperature, hydrogen feed, comonomer feed, propylene feed, catalyst, type and amount of external donor, split between two or more components of a multimodal polymer.

The high melt strength polypropylene (HMS-PP) is preferably obtained by a process as described in EP 0 879 830 A1 and EP 0 890 612 A2. Both documents are herewith included by reference. Accordingly the high melt strength polypropylene (HMS-PP) is produced by (a) mixing
   (i) a unmodified propylene homopolymer and/or copolymer (A) as defined above, preferably a unmodified propylene homopolymer with a weight average molecular weight ($M_w$) of 500,000 to 1,500,000 g/mol,
   (ii) from 0.05 to 3 wt.-% based on the components of (i) and (ii), of a peroxide selected from the group consisting of acyl peroxide, alkyl peroxide, hydroperoxide, perester and peroxycarbonate, and
   (iii) optionally diluted with inert solvents,
(b) heating to 30 to 100° C., preferably to 60 to 90° C.,
(c) sorption of volatile bifunctional monomers, preferably ethylenically unsaturated, multifunctional monomers, like $C_4$ to $C_{10}$ dienes and/or $C_7$ to $C_{10}$ divinyl compounds, by the unmodified propylene homopolymer and/or copolymer (A), preferably unmodified propylene homopolymer (A), from the gas phase at a temperature of from 20 to 120° C., preferably of from 60 to 100° C., where the amount of the absorbed bifunctionally unsaturated monomers is from 0.01 to 10.00 wt.-%, preferably from 0.05 to 2.00 wt.-%, based on the propylene homopolymer (A),
(d) heating and melting the polypropylene composition in an atmosphere comprising inert gas and/or the volatile bifunctional monomers, from sorption temperature to 210° C., whereupon the free-radical generators are decomposed and then
(e) heating the melt up to 280° C. in order to remove unreacted monomers and decomposition products, and
(f) agglomerating the melt.

The process for producing the high melt strength polypropylene (HMS-PP) preferably is a continuous method, performed in continuous reactors, mixers, kneaders and extruders. Batchwise production of the high melt strength polypropylene (HMS-PP), however is feasible as well.

Practical sorption times τ of the volatile bifunctional monomers range from 10 to 1000 s, where sorption times τ of 60 to 600 are preferred.

As mentioned above, the polypropylene (B) is preferably obtained by visbreaking in a manner well known to those skilled in the art. Preferably it is performed as follows: a propylene polymer in particulate form, e.g. "as polymerized" flake or pelletized, has sprayed thereon or blended therewith, a prodegradant or free radical generating source, e.g. a peroxide in liquid or powder form or absorbed on and/or in a carrier, e.g. polypropylene/peroxide concentrate. Typical visbreaking agents are 2,5-dimethyl-2,5-bis(tert.butyl-peroxy) hexane (DHBP) (for instance sold under the tradenames Luperox 101 and Trigonox 101), 2,5-dimethyl-2,5-bis(tert. butyl-peroxy)hexyne-3 (DYBP) (for instance sold under the tradenames Luperox 130 and Trigonox 145), dicumyl-peroxide (DCUP) (for instance sold under the tradenames Luperox DC and Perkadox BC), di-tert.butyl-peroxide (DTBP) (for instance sold under the tradenames Trigonox B and Luperox Di), tert.butyl-cumyl-peroxide (BCUP) (for instance sold under the tradenames Trigonox T and Luperox 801) and bis (tert.butylperoxy-isopropyl)benzene (DIPP) (for instance sold under the tradenames Perkadox 14S and Lupperox DC). Suitable amounts of peroxide to be employed in accordance with the present invention are in principle known to the skilled person and can easily be calculated on the basis of the amount of polypropylene to be subjected to visbreaking, the $MFR_2$ (230° C.) value of the polypropylene to be subjected to visbreaking and the desired target MFR$_2$ (230° C.) of the polypropylene (B) to be obtained. Accordingly, typical amounts of peroxide visbreaking agent are from 0.005 to 0.5 wt.-%, more preferably from 0.01 to 0.2 wt.-%, based on the amount of propylene polymer employed. The propylene polymer and peroxide or propylene polymer/peroxide concentrate is introduced into a means for thermally plasticizing or melt blending and conveying the mixture, e.g., an extruder at elevated temperature. Residence time and temperature are controlled in relation to the particular peroxide selected (i.e., based on the half-life of the peroxide at the process temperature of the extruder) so as to effect the desired degree of polymer chain degradation.

Further, the polymer composition in accordance with the present invention may be prepared by compounding the components within suitable melt mixing devices for preparing polymeric compounds, including in particular extruders single screw extruders as well as twin screw extruders. Other suitable melt mixing devices include planet extruders and single screw co-kneaders. Especially preferred are twin screw extruders including high intensity mixing and kneading sections. Suitable melt temperatures for preparing the compositions are in the range from 170 to 300° C., preferably in the range from 200 to 260° C. and at a throughput of 10 to 500 kg/h and a screw speed of 50 to 200 rpm.

For the preparation of the film an extrusion blown process as known in the art is applied. The film of the present invention is preferably produced by first extruding the polypropylene composition through a circular die, followed by "bubble-like" expansion. The blown film according to this invention is for example produced on a single screw extruder with a barrel diameter of 70 mm and a round-section die of 200 mm with 1.2 mm die gap in combination with a monolip cooling ring and internal bubble cooling (IBC). Melt temperature is preferably 210° C. in the die; the temperature of the cooling air is kept preferably at 15° C. and the blow up ratio (BUR) is preferably of 1:1.5 or less. More preferably, a typical blow up ratio (BUR) of the inventive blown film is 1:1.5 to 1:5, still more preferably the blow-up ratio is 1:2 to 1:4.

Moreover it is preferred that a film thickness is adjusted through the ratio between extruder output, takeoff speed and blow up ratio (BUR). Accordingly it is appreciated that the extrusion blown film of the present invention has a thickness not exceeding 200 μm, prefereably has a tickness in the range of 20 to 200 μm, like 20 to 100 μm.

The present invention will now be described in further detail by the examples provided below.

EXAMPLES

1. Definitions/Measuring Methods

The following definitions of terms and determination methods apply for the above general description of the invention as well as to the below examples unless otherwise defined.

Quantification of isotacticity in polypropylene by $^{13}$C NMR spectroscopy

The isotacticity is determined by quantitative $^{13}$C nuclear magnetic resonance (NMR) spectroscopy after basic assignment as e.g. in: V. Busico and R. Cipullo, Progress in Polymer Science, 2001, 26, 443-533. Experimental parameters are adjusted to ensure measurement of quantitative spectra for this specific task as e.g. in: S. Berger and S. Braun, 200 and More NMR Experiments: A Practical Course, 2004, Wiley-VCH, Weinheim. Quantities are calculated using simple corrected ratios of the signal integrals of representative sites in a manner known in the art. The isotacticity is determined at the pentad level i.e. mmmm fraction of the pentad distribution.

Number average molecular weight ($M_n$), weight average molecular weight ($M_w$) and molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

Randomness

In the FTIR measurements, films of 250-mm thickness were compression moulded at 225° C. and investigated on a Perkin-Elmer System 2000 FTIR instrument. The ethylene peak area (760-700 cm$^{-1}$) was used as a measure of total ethylene content. The absorption band for the structure -P-E-P- (one ethylene unit between propylene units), occurs at 733 cm$^{-1}$. This band characterizes the random ethylene content. For longer ethylene sequences (more than two units), an absorption band occurs at 720 cm$^{-1}$. Generally, a shoulder corresponding to longer ethylene runs is observed for the random copolymers. The calibration for total ethylene content based on the area and random ethylene (PEP) content based on peak height at 733 cm$^{-1}$ was made by $^{13}$CNMR. (Thermochimica Acta, 66 (1990) 53-68).

Randomness=random ethylene (-P-E-P-) content/the total ethylene content×100%.

MFR$_2$ (230° C.) is measured according to ISO 1133 (230° C., 2.16 kg load). Melting temperature Tm and crystallization temperature Tc are measured with a Mettler TA820 differential scanning calorimetry device (DSC) on 3±0.5 mg samples in accordance to ISO 11357-3:1999. Crystallisation and melting temperatures are obtained during 10° C./min cooling and heating scans between 30° C. and 225° C. Melting and crystallization temperatures were taken as the peaks of the endotherms and exotherms, while melting and crystallization enthalpies are taken as the integrals under these peaks. The compositions according to the present invention will normally exhibit at least two distinct melting points with clearly different melting enthalpies, the lower one, Tm(1), normally making up significantly more than 50% of the total melting enthalpy. The difference according to formula (I) is then calculated as Tm(1)–Tc.

Ethylene content is measured with Fourier transform infrared spectroscopy (FTIR) calibrated with $^{13}$C-NMR. When measuring the ethylene content in polypropylene, a thin film of the sample (thickness about 250 mm) was prepared by hot-pressing. The area of absorption peaks 720 and 733 cm$^{-1}$ was measured with Perkin Elmer FTIR 1600 spectrometer. The method was calibrated by ethylene content data measured by $^{13}$C-NMR.

Content of any one of the C4 to C20 α-olefins is determined with $^{13}$C-NMR; literature: "IR-Spektroskopie für Anwender"; WILEY-VCH, 1997 and "Validierung in der Analytik", WILEY-VCH, 1997.

Density is measured according to ISO 1183-187. Sample preparation is done by compression moulding in accordance with ISO 1872-2:2007

The xylene cold solubles (XCS, wt.-%): content of xylene cold solubles (XCS) is determined at 23° C. according ISO 6427.

The gel content is assumed to be identical to the xylene hot insoluble (XHI) fraction, which is determined by extracting 1 g of finely cut polymer sample with 350 ml xylene in a Soxhlet extractor for 48 hours at the boiling temperature. The remaining solid amount is dried at 90° C. and weighed for determining the insolubles amount.

Strain Hardening Factor:

The uniaxial extensional viscosity ($\eta_E^+(t, \dot{\epsilon})$) was obtained from uniaxial extensional flow measurements, conducted on an Anton Paar MCR 501 coupled with the Sentmanat extensional fixture (SER-1). The temperature for the uniaxial extensional flow measurements was set at 180° C., applying extension rates ranging from 0.3 s$^{-1}$ to 10 s$^{-1}$ in a range of Hencky strain from 0.5 to 3.5. Particularly care was taken for the preparation of the samples for extensional flow. The samples having a thickness of 0 6 mm were prepared by compression moulding at 230° C. followed by slow cooling at about 2° C./min to room temperature (forced water or air cooling were not used). This procedure allowed obtaining well shaped samples free of residual stresses. The sample was left for some minutes at the testing temperature of 180° C. to ensure thermal stability, before carrying out the uniaxial extensional flow measurements.

The strain hardening factor is defined by formula (II)

$$SHF = \frac{\eta_E^+(t, \dot{\epsilon})}{\eta_{LVE}^+(t)} = \frac{\eta_E^+(t, \dot{\epsilon})}{3\eta^+(t)}$$

wherein, $\eta_E^+(t, \dot{\epsilon})$ is the uniaxial extensional viscosity; and $\eta_{LIVE}^+(t)$ is three times the time dependent shear viscosity ($\eta^+(t)$) in the linear range of deformation.

The determination of the linear viscoelastic envelop in extension ($\eta_{LIVE}^+(t)$), using IRIS Rheo Hub 2008, required the calculation of the discrete relaxation time spectrum from the storage and loss modulus data (G', G" ($\omega$)). The linear viscoelastic data (G', G" ($\omega$)) was obtained by frequency sweep measurements undertaken at 180° C., on a Anton Paar MCR 300 coupled with 25 mm parallel plates. The underlying calculation principles used for the determination of the discrete relaxation spectrum are described in Baumgärtel M, Winter HH, "Determination of the discrete relaxation and retardation time spectra from dynamic mechanical data", Rheol Acta 28:511519 (1989).

IRIS RheoHub 2008 expresses the relaxation time spectrum as a sum of N Maxwell modes $$\overset{o}{G}(t) = G_e \cdot \sum_{1}^{N} g_i \cdot e^{-\frac{t}{\lambda_i}}$$

wherein g$_i$ and $\lambda_i$ are material parameters resulting from the spectrum calculation and G$_e$ is the equilibrium modulus for isotactic polypropylene.

The choice for the maximum number of modes, N used for determination of the discrete relaxation spectrum, was done by using the option "optimum" from IRIS RheoHub 2008. The equilibrium modulus G$_e$ was set at zero. The non-linear fitting used to obtain the linear viscoelastic envelop in extension ($\eta_{LIVE}^+(t)$) was performed on IRIS Rheo Hub 2008, using the Doi-Edwards model.

Haze was determined according to ASTM D 1003-00 on the extrsuion blown films having a thickness of 40 μm.

Gloss was determined according to DIN 67530 on the extrusion blown films having a thickness of 40 μm at an angle of 20°.

2. Preparation of the Examples

The components were blended according to Table 2. For stabilization of the materials a conventional additive package has been used like 0.2 wt/% Irganox B225 (antioxidant masterbatch supplied by Ciba Specialty Chemicals, Switzerland) and 0.05 wt % Ca-Stearate (CAS-No. 1592-23-0). Blending took place in a twin screw extruder (PRISM TSE24 L/D ratio 40) with two high intensity mixing segments at temperatures between 190 and 240° C. at a through put of 10 kg/h and a screw speed of 50 rpm. The material was extruded to two circular dies of 3 mm diameter into a water bath for strand solidification and then pelletized and dried. The films were made on the W&H Monolayer blown film line (one 70 mm extruder, throughput (total) 60 kg/h, die diameter 200 mm, die gap 1.2 mm, blow-up Ratio 1:2.5) with the following processing parameters:

TABLE 1

Processing Parameters

| T(melt) | ° C. | 240 |
|---|---|---|
| V(screw) | rpm | 70 |
| V(line) | m/min | 15 |
| d(FL)* | mm | 600 |

TABLE 2

Polypropylene compositions

|  | R-PP [g] | HMS [g] | PP [g] | α-1 [ppm] |
|---|---|---|---|---|
| CE 1 | 100.00 | — | — | 4000 |
| CE 2 | 95.00 | — | 5.00 | 4000 |
| IE 1 | 87.50 | 7.50 | 5.00 | 4000 |

R-PP: is the commercial random propylene ethylene copolymer "RB709CF" of Borealis with an ethylene content of 4.5 wt.-%, a MFR$_2$ (230° C.) of 1.5 g/10 min, a density of 901 kg/m$^3$ and xylene cold soluble fraction (XCS) of 8.5 wt.-%.
HMS: is the commercial high melt strength polypropylene Daploy™ WB180HMS of Borealis based on a propylene homopolymer, wherein the high melt strength polypropylene Daploy™ WB180HMS has a density of 905 kg/m$^3$, a melting point of 165° C., MFR$_2$ (230° C.) of 6.0 g/10 min, a melt strength of 11.5 cN at a maximum speed of 242 mm/s, a xylene cold soluble fraction (XCS) of 2.5 wt.-% and a branching index g' of 0.64.
PP: is the commercial visbroken polypropylene "HL504FB" of Borealis with a MFR$_2$ (230° C.) of 450 g/10 min
α-1: is the commercial α-nucleating agent Millad NX8000 (Nonitol, 1,2,3,-trideoxy-4,6:5, 7-bis-O-[(4-propylphenyl)methylene]-nonitol)

TABLE 3

Properties of the polypropylene compositions

|  |  | CE 1 | CE 2 | E 1 |
|---|---|---|---|---|
| MFR | [g/10 min] | 1.5 | 4.0 | 3.2 |
| Tm(1) | [° C.] | 136 | 137 | 136 |
| Hm(1) | [J/g] | 94 | 96 | 86 |
| Tm(2) | [° C.] | — | — | 156 |
| Hm(2) | [J/g] | — | — | 10 |
| Tc | [° C.] | 122 | 120 | 124 |
| SHF** | [—] | 0.9 | 0.8 | 1.5 |
| XCS | [wt.-%] | 7.0 | 6.8 | 6.6 |

*"MFR" is MFR$_2$ (230° C.)
**SHF is the strain hardening factor (SHF) measured at a strain rate of 3.0 s$^{-1}$ and a Hencky strain of 3.0

TABLE 4

Properties of the extrusion blown film

|  |  | CE 1 | CE 2 | E 1 |
|---|---|---|---|---|
| MFR | [g/10 min] | 1.5 | 4.0 | 3.2 |
| SHF** | [—] | 0.9 | 0.8 | 1.5 |
| Haze | [%] | 4.6 | 6.7 | 4.5 |
| Gloss inside | [%] | 60 | 79 | 76 |
| Gloss outside | [%] | 59 | 81 | 79 |

TABLE 4-continued

Properties of the extrusion blown film

|  |  | CE 1 | CE 2 | E 1 |
|---|---|---|---|---|
| Tensile test (MD) | | | | |
| Modulus | [MPa] | 923 | 793 | 847 |
| Yield stress | [MPa] | 27.7 | 25.7 | 25.7 |
| Extension at yield | [%] | 9.6 | 10.4 | 9.9 |
| Extension at break | [%] | 680 | 620 | 650 |
| Tensile test (TD) | | | | |
| Modulus | [MPa] | 910 | 799 | 838 |
| Yield stress | [MPa] | 25.2 | 23.0 | 23.5 |
| Extension at yield | [%] | 8.2 | 8.5 | 8.0 |
| Extension at break | [%] | 680 | 700 | 720 |

*"MFR" is MFR$_2$ (230° C.)
**SHF is the strain hardening factor (SHF) measured at a strain rate of 3.0 s$^{-1}$ and a Hencky strain of 3.0

We claim:

1. Extrusion blown film comprising a polypropylene composition, said polypropylene composition comprising a random propylene copolymer (R-PP), a high melt strength polypropylene (HMS-PP), a polypropylene (B) and optionally a clarifier (C), wherein
    (a) the random propylene copolymer (R-PP) comprises units derived from propylene and at least another C$_2$ to C$_{20}$ α-olefin,
    (b) the high melt strength polypropylene (HMS-PP) has a branching index g' of less than 1.0,
    (c) the polypropylene (B) has a MFR$_2$ (230° C.) measured according to ISO 1133 of at least 400 g/10 min,
    (d) the clarifier (C) comprises at least one α-nucleating agent (N), and wherein further
    (i) the branching index g' of the random propylene copolymer (R-PP) and the branching index g' of the polypropylene (B) are higher than the branching index g' of the high melt strength polypropylene (HMS-PP),
    (ii) the random propylene copolymer (R-PP) has lower melt flow rate MFR$_2$ (230° C.) measured according to ISO 1133 than the polypropylene (B),
    (iii) the extrusion melt blown film
        (α) fulfill(s) the equation (I)

$$Tm - Tc \leq 30 \quad (I)$$

wherein
        Tm is the melting temperature [° C.] making up more than 50% of the total melting enthalpy Hm of the extrusion melt blown film measured by DSC according to ISO 11357-3;
        Tc is the crystallization temperature [° C.] of the extrusion blown film measured by DSC according to ISO 11357-3; and
        (β) has a melt flow rate MFR$_2$ (230° C.) measured according to ISO 1133 of 1.0 to 5.5 g/10 min,
    wherein the polypropylene (B) has been visbroken.

2. Extrusion blown film according to claim 1, wherein the film and/or the polypropylene composition has (have)
    (a) a strain hardening factor (SHF) of 1.2 to 3.0 measured at a strain rate of 3.0 s$^{-1}$ and a Hencky strain of 3.0, and/or
    (b) a gel content determined as the xylene hot insoluble (XHI) fraction of equal or below 1.0 wt.-% and/or
    (c) a xylene cold soluble fraction (XCS) of not more than 15.0 wt.-%.

3. Extrusion blown film according to claim 1, wherein the amount of units derived from C$_2$ to C$_{20}$ α-olefins other than propylene is not more than 7.0 wt.-% in the extrusion blown film and/or in the polypropylene composition.

4. Extrusion blown film according to claim 1, wherein the amount of units derived from C$_2$ to C$_{20}$ α-olefins other than propylene is in the range of 1.0 to 7.0 wt.-% in the random propylene copolymer (R-PP).

5. Extrusion blown film according to claim 1, wherein the random propylene copolymer (R-PP) has
    (a) a xylene cold soluble fraction (XCS) determined according to ISO 6427 of not more than 15.0 wt-%, and/or
    (b) a MFR$_2$ (230° C.) measured according ISO 1133 of not more than 4.5 g/10 min.

6. Extrusion blown film according to claim 1, wherein the high melt strength polypropylene (HMS-PP) has strain hardening factor (SHF) of 3.5 to 30.0 measured at a strain rate of 3.0 s$^{-1}$ and a Hencky strain of 3.0.

7. Extrusion blown film according to claim 1, wherein the high melt strength polypropylene (HMS-PP) comprises units derived from
    (i) propylene and
    (ii) bifunctionally unsaturated monomer(s) and/or multifunctionally unsaturated low molecular weight polymer (s).

8. Extrusion blown film according to claim 1, wherein the high melt strength polypropylene (HMS-PP) has
    (a) an xylene hot insoluble (XHI) fraction of not more than 1.0 wt.-% and/or
    (b) a MFR$_2$ (230° C.) measured according ISO 1133 of 1.0 to 10.0 g/10 min.

9. Extrusion blown film according to claim 1, wherein the polypropylene (B) is a propylene homopolymer (H-PP).

10. Extrusion blown film according to claim 1, wherein the visbroking ratio (final MFR$_2$ (230° C.)/initial MFR$_2$ (230° C.)) of the polypropylene (B) is 3.0 to 40.0.

11. Extrusion blown film according to claim 1, wherein the α-nucleating agent(s) (N) are selected from the group consisting of
    (i) salts of monocarboxylic acids and polycarboxylic acids, and
    (ii) dibenzylidenesorbitol and C$_1$-C$_8$-alkyl-substituted dibenzylidenesorbitol derivatives, and
    (iii) salts of diesters of phosphoric acid, and
    (iv) vinylcycloalkane polymer and vinylalkane polymer.

12. Extrusion blown film according to claim 1, wherein the polypropylene composition comprises
    (a) 50.0 to 92.0 wt.-% of the random propylene copolymer (R-PP),
    (b) 5.0 to 26.0 wt.-% of the high melt strength polypropylene (HMS-PP),
    (c) 1.0 to 15.0 wt.-% of the polypropylene (B), and
    (d) 0.01 to 5.0 wt.-% of the clarifier (C),
    based on the total polypropylene composition.

13. Extrusion blown film according to claim 1, wherein said extrusion blown film comprises at least 80 wt.-% of said polypropylene composition.

14. A packaging material comprising the extrusion blown film according to claim 1.

15. Extrusion blown film according to claim 1, wherein said extrusion blown film consists of said polypropylene composition.

16. A polypropylene composition comprising a random propylene copolymer (R-PP), a high melt strength polypropylene (HMS-PP), a polypropylene (B) and optionally a clarifier (C), wherein (a) the random propylene copolymer (R-PP) comprises units derived from propylene and at least another $C_2$ to $C_{20}$ α-olefin,
(b) the high melt strength polypropylene (HMS-PP) has a branching index g' of less than 1.0,
(c) the polypropylene (B) has a $MFR_2$ (230° C.) measured according to ISO 1133 of at least 400 g/10 min,
(d) the clarifier (C) comprises at least one α-nucleating agent (N), and
wherein further
(i) the branching index g' of the random propylene copolymer (R-PP) and the branching index g' of the polypropylene (B) are higher than the branching index g' of the high melt strength polypropylene (HMS-PP),
(ii) the random propylene copolymer (R-PP) has lower melt flow rate $MFR_2$ (230° C.) measured according to ISO 1133 than the polypropylene (B),
(iii) the polypropylene composition
(α) fulfill(s) the equation (I)

$$Tm - Tc \leq 30 \qquad (I)$$

wherein
Tm is the melting temperature [° C.] making up more than 50% of the total melting enthalpy Hm of the polypropylene composition measured by DSC according to ISO 11357-3;
Tc is the crystallization temperature [° C.] of the polypropylene composition measured by DSC according to ISO 11357-3; and
(β) has a melt flow rate $MFR_2$ (230° C.) measured according to ISO 1133 of 1.0 to 5.5 g/10 min,
(iv) the polypropylene (B) has been visbroken,
wherein the high melt strength polypropylene (HMS-PP) has
(a) an xylene hot insoluble (XHI) fraction of not more than 1.0 wt.-% and/or
(b) a $MFR_2$ (230° C.) measured according ISO 1133 of 1.0 to 10.0 g/10 min.

17. Process for the preparation of an extrusion blown film comprising steps of:
providing a polypropylene composition, said polypropylene composition comprising a random propylene copolymer (R-PP), a high melt strength polypropylene (HMS-PP), a polypropylene (B) and optionally a clarifier (C), wherein
(a) the random propylene copolymer (R-PP) comprises units derived from propylene and at least another $C_2$ to $C_{20}$ α-olefin,
(b) the high melt strength polypropylene (HMS-PP) has a branching index g' of less than 1.0,
(c) the polypropylene (B) has a $MFR_2$ (230° C.) measured according to ISO 1133 of at least 400 g/10 min,
(d) the clarifier (C) comprises at least one α-nucleating agent (N), and wherein further
(i) the branching index g' of the random propylene copolymer (R-PP) and the branching index g' of the polypropylene (B) are higher than the branching index g' of the high melt strength polypropylene (HMS-PP),
(ii) the random propylene copolymer (R-PP) has lower melt flow rate $MFR_2$ (230° C.) measured according to ISO 1133 than the polypropylene (B),
(iii) the polypropylene composition
(α) fulfill(s) the equation (I)

$$Tm - Tc \leq 30 \qquad (I)$$

wherein
Tm is the melting temperature [° C.] making up more than 50% of the total melting enthalpy Hm of the polypropylene composition measured by DSC according to ISO 11357-3;
Tc is the crystallization temperature [° C.] of the polypropylene composition measured by DSC according to ISO 11357-3; and
(β) has a melt flow rate $MFR_2$ (230° C.) measured according to ISO 1133 of 1.0 to 5.5 g/10 min,
(iv) the polypropylene (B) has been visbroken, and
providing cooling of said polypropylene composition; and
extruding said polypropylene composition for forming said extrusion blown film.

18. Process for the preparation of an extrusion blown film of claim 17, wherein said cooling includes air forming air cooled extrusion blown film.

19. Extrusion blown film comprising a polypropylene composition, said polypropylene composition comprising a random propylene copolymer (R-PP), a high melt strength polypropylene (HMS-PP), a polypropylene (B) and optionally a clarifier (C), wherein
(a) the random propylene copolymer (R-PP) comprises units derived from propylene and at least another $C_2$ to $C_{20}$ α-olefin,
(b) the high melt strength polypropylene (HMS-PP) has a branching index g' of less than 1.0,
(c) the polypropylene (B) has a $MFR_2$ (230° C.) measured according to ISO 1133 of at least 400 g/10 min,
(d) the clarifier (C) comprises at least one α-nucleating agent (N), and wherein further
(i) the branching index g' of the random propylene copolymer (R-PP) and the branching index g' of the polypropylene (B) are higher than the branching index g' of the high melt strength polypropylene (HMS-PP),
(ii) the random propylene copolymer (R-PP) has lower melt flow rate $MFR_2$ (230° C.) measured according to ISO 1133 than the polypropylene (B),
(iii) the extrusion blown film
(α) fulfills the equation (I)

$$Tm - Tc \leq 30 \qquad (I)$$

wherein
Tm is the melting temperature [° C.] making up more than 50% of the total melting enthalpy Hm of the extrusion blown film measured by DSC according to ISO 11357-3;
Tc is the crystallization temperature [° C.] of the extrusion blown film measured by DSC according to ISO 11357-3;
(β) has a melt flow rate $MFR_2$ (230° C.) measured according to ISO 1133 of 1.0 to 5.5 g/10 min, and
wherein the polypropylene composition comprises
(a) 50.0 to 92.0 wt.-% of the random propylene copolymer (R-PP),
(b) 5.0 to 26.0 wt.-% of the high melt strength polypropylene (HMS-PP),
(c) 1.0 to 15.0 wt.-% of the polypropylene (B), and
(d) 0.01 to 5.0 wt.-% of the clarifier (C),
based on the total polypropylene composition.

* * * * *